United States Patent [19]

Owaki et al.

[11] Patent Number: 5,650,796
[45] Date of Patent: Jul. 22, 1997

[54] MATRIX LIQUID CRYSTAL DISPLAY HAVING FUNCTION TO CORRECT VIEWING ANGLE

[75] Inventors: Yoshio Owaki, Mobara; Hideo Kawamura, Chiba-ken; Junichi Ohwada, Mobara; Yukihiro Sato, Mobra, all of Japan

[73] Assignees: Hitachi, Ltd., Tokyo; Hitachi Device Engineering Co, Ltd., Mobara, both of Japan

[21] Appl. No.: 330,069

[22] Filed: Oct. 26, 1994

Related U.S. Application Data

[63] Continuation-in-part of Ser. No. 113,086, Aug. 30, 1993, which is a continuation of Ser. No. 666,900, Mar. 8, 1991, Pat. No. 5,250,937.

[30] Foreign Application Priority Data

Nov. 4, 1993 [JP] Japan ............... 5-275116

[51] Int. Cl.$^6$ .................................... G09G 3/36
[52] U.S. Cl. .................................... 345/94
[58] Field of Search .................... 345/94–97

[56] References Cited

U.S. PATENT DOCUMENTS

| | | |
|---|---|---|
| 4,635,127 | 1/1987 | Togashi . |
| 4,906,984 | 3/1990 | Takeda et al. . |
| 5,243,454 | 9/1993 | Nakamura ................ 345/94 |
| 5,250,937 | 10/1993 | Kikuo et al. . |

FOREIGN PATENT DOCUMENTS

| | | |
|---|---|---|
| 59-220793 | 12/1984 | Japan . |
| 1-191196 | 8/1989 | Japan . |
| 4-153690 | 5/1992 | Japan . |
| 5-150735 | 1/1993 | Japan . |

OTHER PUBLICATIONS

Electronics Devices, discrete and Integrated Circuits by Arthur H. Seidman et al. p. 148 1977.

*Primary Examiner*—Jeffery Brier
*Attorney, Agent, or Firm*—Antonelli, Terry, Stout & Kraus, LLP

[57] ABSTRACT

A liquid crystal display capable of changing the polarities of voltages to be applied to a liquid crystal for every scanning line, so as to correct viewing angle characteristics. The liquid crystal display includes: a circuit for generating a view angle correcting signal on the basis of a vertical scanning signal which is generated by a pulse at the scanning start of one field; circuits for converting the viewing angle correcting signal into an AC signal by changing its polarity for every scanning lines; and a driver for generating a video signal from the AC viewing angle correcting signal.

2 Claims, 7 Drawing Sheets

FIG. 7 and, more particularly, to a projection type liquid crystal display, that is, a liquid crystal display having the function of correcting the difference in brightness in the vertical direction of the screen, which is depending on the viewing angle.

MATRIX LIQUID CRYSTAL DISPLAY HAVING FUNCTION TO CORRECT VIEWING ANGLE

CROSS-REFERENCE TO RELATED APPLICATION

This is a CIP of our U.S. patent application Ser. No. 08/113,086, filed on Aug. 30, 1993, the disclosure of which is hereby incorporated by reference, which is a continuing application of U.S. patent application Ser. No. 07/666,900, filed Mar. 8, 1991, now U.S. Pat. No. 5,250,937.

BACKGROUND OF THE INVENTION (1) Field of the Invention

The present invention relates to a liquid crystal display and, more particularly, to a projection type liquid crystal display, that is, a liquid crystal display having the function of correcting the difference in brightness in the vertical direction of the screen, which is depending on the viewing angle.

(2) Description of the Prior Art

In the liquid crystal display of the prior art, the polarity of the voltages applied to the liquid crystal is inverted each field and in adjacent video signal lines. Moreover, the phenomenon that brightness changes with the viewing direction of the display panel is prevented by changing the display brightness in the vertical scanning direction, i.e., by correcting the so-called "viewing angle characteristics".

Specifically, a corrective signal is generated, for example, by differentiating and integrating the signals whose polarity is inverted every field, and the corrective signal is applied to the liquid crystal of each scanning line.

This concept of the prior art is disclosed in Patent Publications such as U.S. Pat. No. 4,906,984 and Japanese Patent Laid-Open No. 59-220,797 (on Dec. 12, 1984).

SUMMARY OF THE INVENTION

In the prior art described above, the display characteristics such as the flicker of the display screen or the crosstalk to be produced vertically of the screen can be improved by inverting the polarities of the liquid crystal applied voltages for every scanning lines. In case, however, a viewing angle correcting signal is to be generated merely by differentiating and integrating the signals having their polarities changing for every scanning line, the viewing angle characteristics cannot be corrected because the effective voltage values of the signal applied to the liquid crystal does not change for every scanning lines. Moreover, no prior art has succeeded in specifically disclosing the concept of inverting the polarities of the liquid crystal applied voltages for every scanning line by using the signal for correcting the viewing angle.

On the basis of this background, therefore, the present invention has been conceived and has an object to provide a liquid crystal display for changing the polarities of the voltage applied to the liquid crystal for every scanning line, which display has its display characteristics such as the flicker in the display screen or the crosstalk in the vertical direction of the screen improved by disclosing a specific liquid crystal display driver enabled to invert the polarities of the voltage applied to the liquid crystal for every scanning line by using a signal for correcting the viewing angle characteristics.

In order to achieve this object, according to the present invention, there is provided a liquid crystal display for inverting the polarities of voltage to be applied to a liquid crystal for every scanning line, which display comprises: means (10) for generating a viewing angle correcting signal (VS) on the basis of a vertical synchronizing signal (VSYNC) to be generated by a pulse at the scanning start of one field; arithmetic means (12) including an arithmetic element capacitance-coupled to the viewing angle correcting signal generating means (10), for generating a plurality of kinds of reference voltages (VC+VS+VDC, VC−VS−VDC) around a predetermined central voltage (VC) by correcting a predetermined amplitude voltage (VDC) with the viewing angle correcting signal (VS); means (14) for generating two kinds of viewing angle correcting reference voltages (VU, VL) having their polarities inverted from each other, from the plurality of reference voltages outputted from the arithmetic means and an alternating signal (M); and means (B, VC, He, Ho) for generating a video signal (X) from the viewing angle correcting reference voltages.

In the liquid crystal display thus constructed, the viewing angle correcting signal is generated on the basis of the vertical synchronizing signal which is generated by the pulse at the scanning start of one field.

As a result, even if said viewing angle correcting signal is then converted into an AC signal, this AC signal is allowed to function as it is without deteriorating the viewing angle correcting function.

Since said AC conversions can be effected such that the polarities are changed for every scanning line, the display characteristics such as the flicker on the display screen or the crosstalk in the vertical direction of the screen can be improved while correcting the viewing angle characteristics.

From these effects, the viewing angle characteristics can be corrected while premising that the polarities of the liquid crystal applied voltages are changed for every scanning line.

The foregoing and other objects, advantages, manner of operation and novel features of the present invention will be understood from the following detailed description when read in connection with the accompanying drawings.

DESCRIPTION OF THE PREFERRED EMBODIMENTS

One embodiment of a liquid crystal display driver according to the present invention is described with reference to the accompanying drawings.

Figure 5:
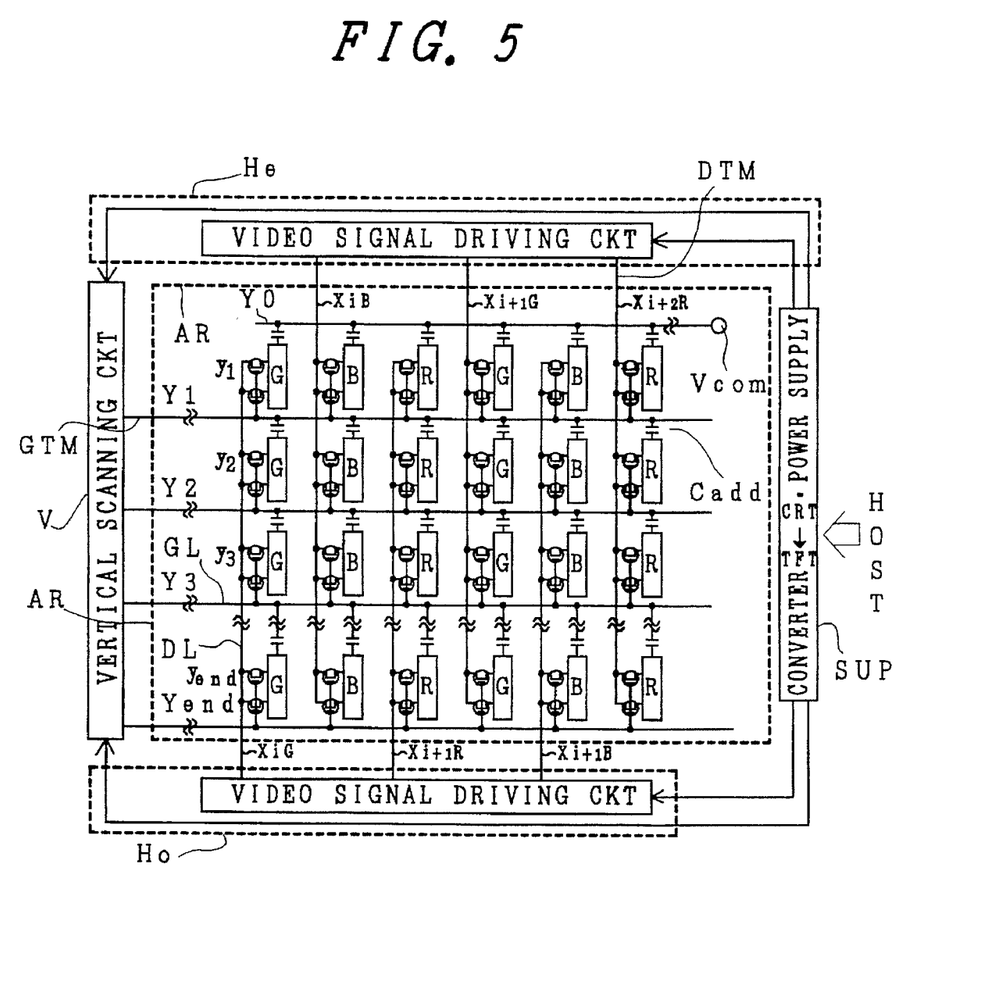
FIG. 5 is a schematic circuit diagram showing one embodiment of a liquid crystal display to which is applied the present invention.

FIG. 5 is a circuit diagram of an equivalent circuit and its peripheral circuits of a display matrix portion of a liquid crystal display to which is applied the present invention. FIG. 5 is a circuit diagram corresponding to the actual geometric arrangement. A matrix array AR includes a plurality of two-dimensionally arrayed pixels.

In FIG. 5, letter X designates video signal lines DL, to which are added suffixes G, B and R corresponding to green, blue and red pixels, respectively. Letter Y designates scanning signal lines GL, to which are added suffixes 1, 2, 3, - - -, and end in the timing sequence.

The video signal lines X (having their suffixes omitted) are alternately connected with an upper (or odd) video signal driver He and a lower (or even) video signal driver Ho. The scanning signal lines Y (having their suffixes omitted) are connected with a vertical scanning driver V.

Letters SUP designate a converter for converting the CRT (i.e., Cathode Ray Tube) information coming from either a voltage source circuit for establishing a plurality of divided stable voltage sources from one voltage source on a host (e.g., a host arithmetic processor) into the information for a TFT liquid crystal display.

Figure 6:
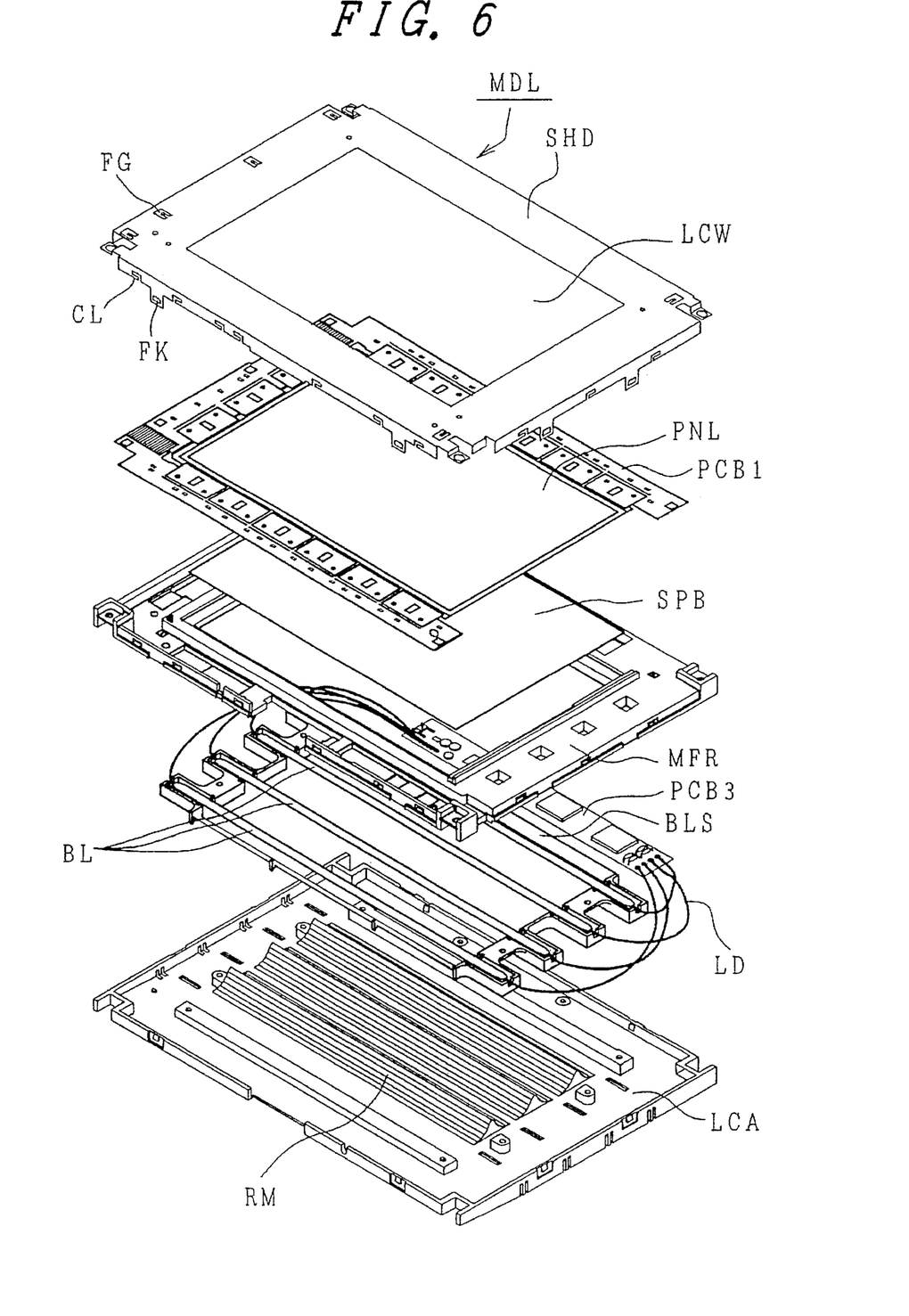
FIG. 6 is an exploded perspective viewing showing one embodiment of the liquid crystal display to which is applied the present invention.

FIG. 6 is an exploded perspective viewing showing the individual components of a liquid crystal display module MDL.

Letters SHD designate a frame-shaped shield case (or metal frame) made of a metal sheet; letters LCW designate a liquid crystal window of the shield case; letters PNL designate a liquid crystal panel; letters SPB a scattering board; letters MFR a middle frame; letters BL cold fluorescent lamps for back light; letters BLS a back light supporter; and letters LCA a lower case. These components are stacked in the shown vertical arrangement to assemble the module MDL.

This module MDL is fixed in its entirety by claws CL and hooks FK which are formed on the shield case SHD.

The middle frame MFR is frame-shaped to have an opening corresponding to the liquid crystal window LCW, which is formed with not only corrugations according to shapes and thicknesses of the scattering board SPB, the back light supporter and the various circuit parts but also openings for thermal radiations.

The lower case LCA acts as a reflector of the back light, too, and is formed with reflecting peak-like members RM corresponding to the fluorescent lamps BL so that it may effect efficient reflections.

Figure 7:
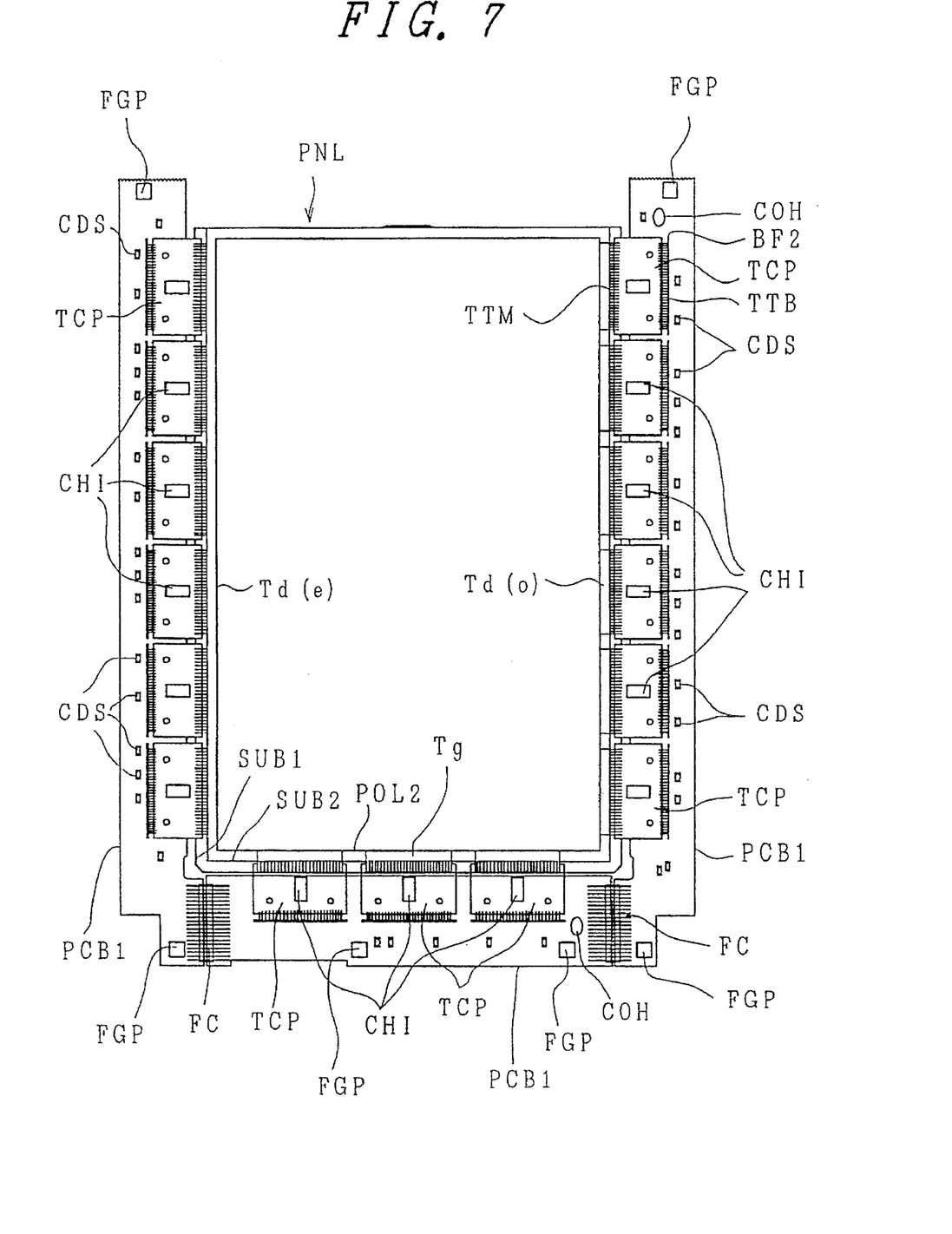
FIG. 7 is an explanatory diagram showing one embodiment of a driver circuit board on which is mounted the liquid crystal display driver according to the present invention.

FIG. 7 is a top plan viewing showing the state in which the video signal drivers He and Ho and the vertical scanning driver V are connected with the liquid crystal panel PNL.

Letters CHI designate driver IC chips (of which the lower three are the driver chips at the side of the vertical scanning driver whereas the lefthand and righthand six are the driver chips at the side of the video signal drivers. Letters TCP designate tape carrier packages which are made by the tape automated bonding (i.e., TAB) method. Letters PCB1 designate a driver circuit board which has the aforementioned TCP and a capacitor CDS packaged therein and which is divided into three portions. One of the three portions is a lefthand printed circuit board which has a plurality of video signal drivers for odd (or even) lines of LCD, another of the three portions is a lower printed circuit board which has a plurality of scanning drivers and the remaining portion is a righthand printed circuit board which has a plurality of video signal drivers for even (or odd) lines of LCD. Letters FGP designate frame ground pads, to which are soldered spring-shaped fragments FG formed by cutting the shield case SHD. Letters FC designate flat cables for connecting the lower driver circuit board PCB1 and the lefthand and righthand driver circuit boards PCB1 electrically. The flat cables FC used are constructed by sandwiching a plurality of lead lines (having a bronze material plated with Sn) between the striped polyethylene layer and a polyvinyl alcohol layer, as shown.

Figure 1:
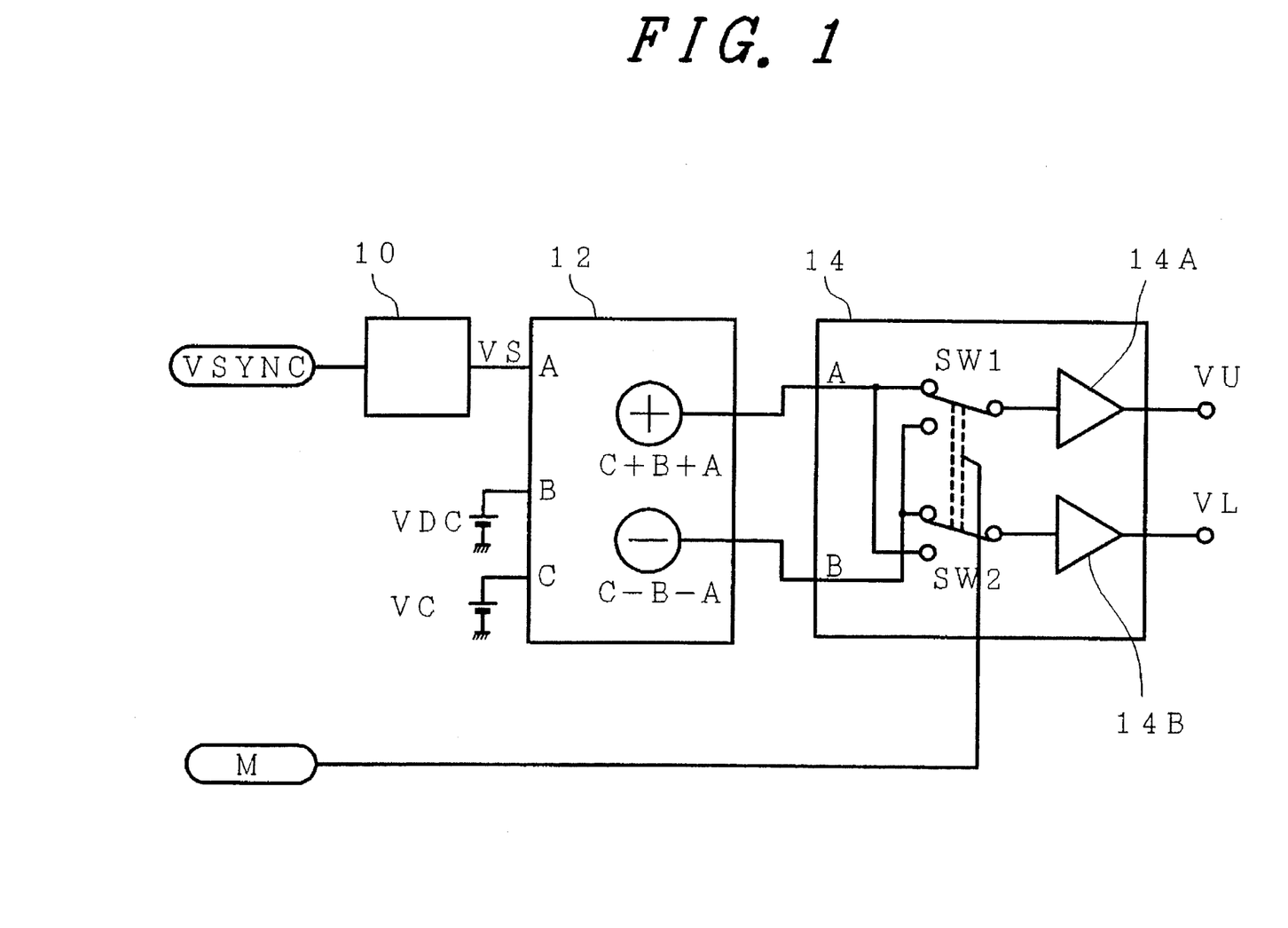
FIG. 1 is a circuit diagram showing one embodiment of the front portion of liquid crystal display driver according to the present invention.

FIG. 1 is a schematic circuit diagram showing one embodiment of a liquid crystal display driver according to the present invention. This liquid crystal display driver is packaged as a driver IC chip CHI on the driver circuit board PCB1 as shown in FIG. 7.

Figure 3A:
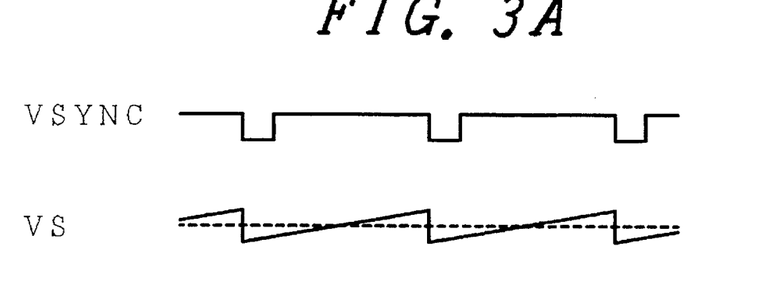
FIGS. 3A to 3C are waveform diagrams illustrating the operations of the circuit shown in FIG. 1.
Figure 3B:
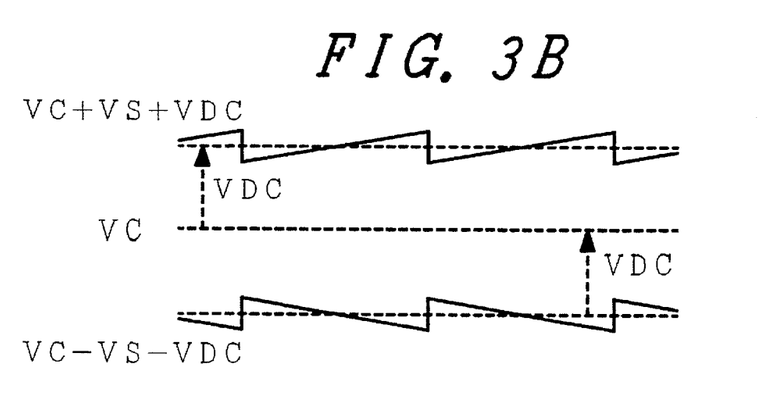
Figure 3C:
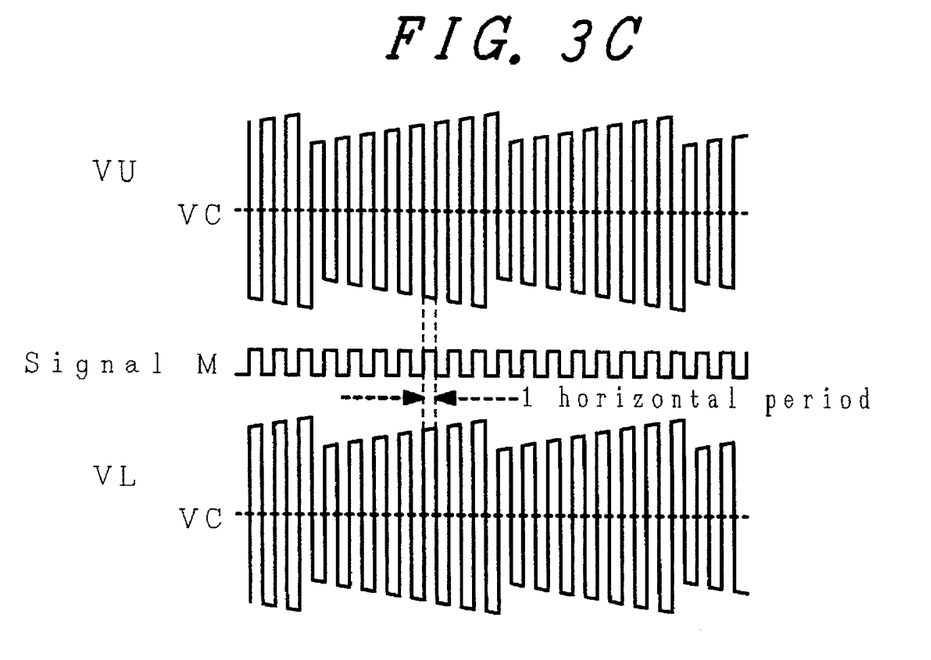

In FIG. 1, a vertical synchronizing signal VSYNC for generating a pulse at the scanning start of one field, as shown in FIGS. 3A–3C.

This signal is inputted to an angle correcting signal generator 10. This angle correcting signal generator 10 generates a viewing angle characteristic correcting signal VS in synchronism with the input signal and has such saw-tooth waveforms, as illustrated in FIG. 3A, for example.

Moreover, this angle correcting signal VS is inputted to an input terminal of an arithmetic element OP of an arithmetic processor 12 via a line having a capacitance 15 so that the arithmetic element is capacitance-coupled to the angle correcting signal generator 10. This arithmetic processor 12 is further fed with an amplitude voltage VDC and a central voltage VC so that it can generate two output signals by suitably adding and subtracting those voltage values and the aforementioned angle correcting signal VS.

Specifically, the signals thus generated are given the voltage values (C+B+A) and (C−B−A) if: the angle correcting signal VS has a voltage value A; the amplitude voltage VDC has a voltage value B; and the central voltage VC has a voltage value C. The signal having the voltage value (C+B+A) has a waveform, as illustrated in FIG. 3B, and the voltage having a voltage value (C−B−A) has a waveform, as shown in FIG. 3B. As will be apparent from FIG. 3B, these two signals have their polarities inverted with reference to the voltage VC.

After this, these signals are individually inputted to a chopping circuit 14. This chopping circuit 14 is equipped with two switches SW1 and SW2 which are associated by an AC conversion signal M.

Specifically, this AC conversion signal M has its voltage value changing with every scanning line so that the aforementioned individual switches SW1 and SW2 are alternately switched.

As a result, the signals having the voltage values (C+B+A) and (C−B−A) are alternately mixed in response to the alternate switching of the switch SW1 for every scanning line so that a signal VU is generated through a buffer 14A.

At the same time, on the other hand, the switch SW2 is also alternately switched for every scanning line so that the signals having the voltage values (C+B+A) and (C−B−A) are alternately mixed in response to the alternate switching, to generate a signal VL through a buffer 14B.

As a result, the above-specified signals VU and VL take the individual waveforms, as illustrated in FIG. 3C. As will be apparent from this Figure, these individual signals have their waves formed to correct the viewing angle as a whole and their polarities inverted for every scanning line (as responds to the change in the M signal).

Figure 2:
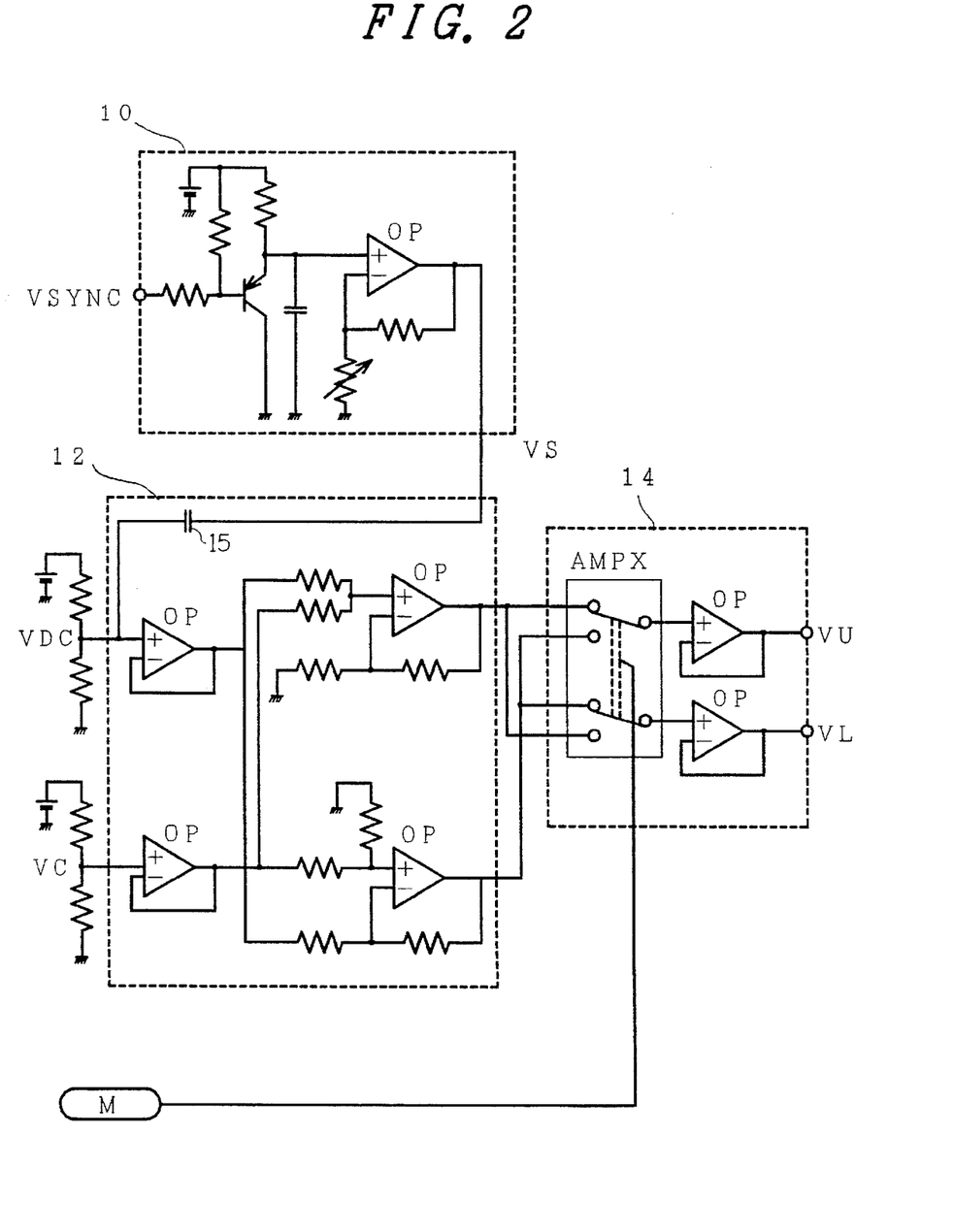
FIG. 2 is a circuit diagram showing a specific construction of the circuit shown in FIG. 1.

Incidentally, a more specific construction of the circuit shown in FIG. 1 is exemplified in FIG. 2.

Figure 4:
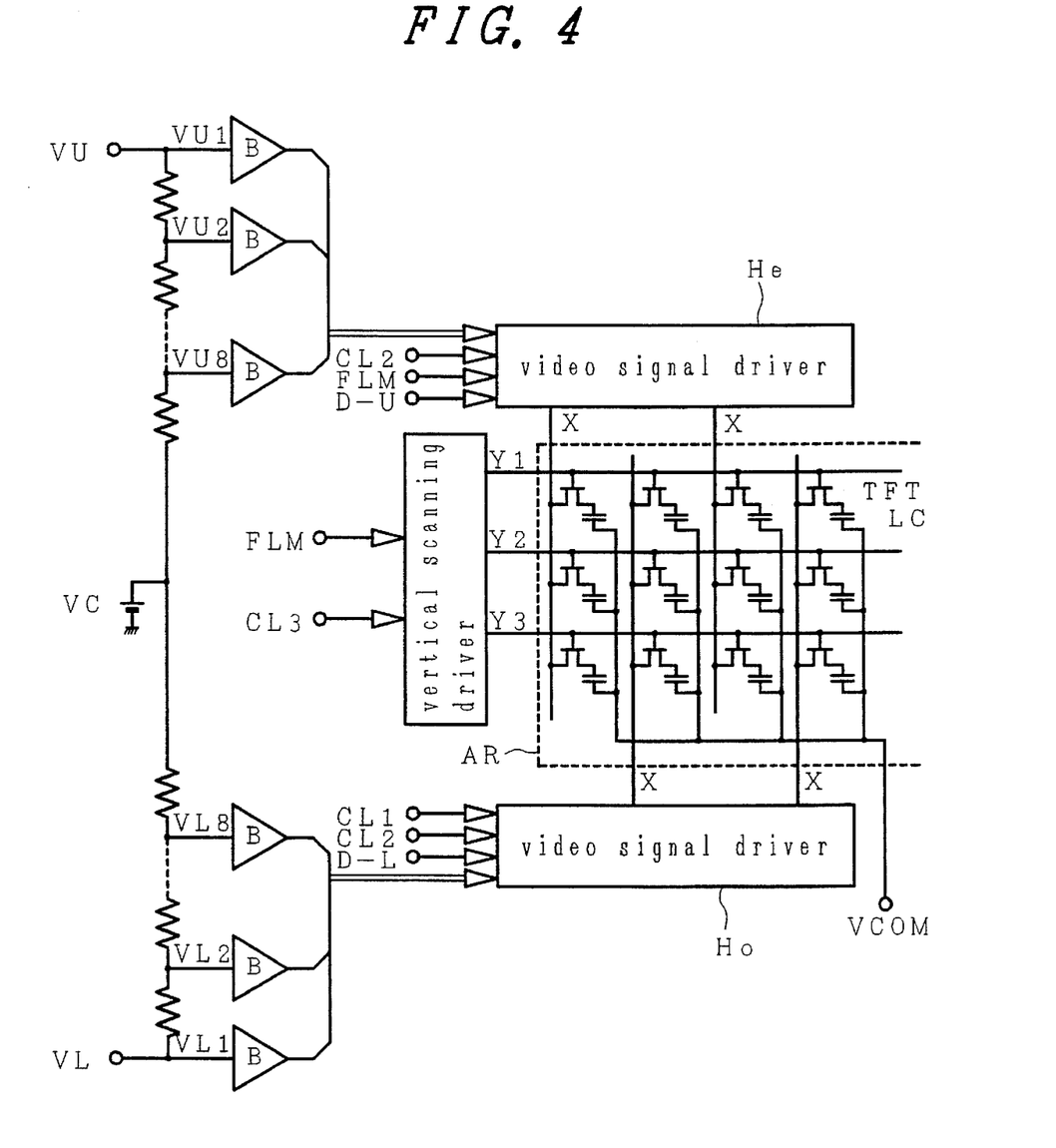
FIG. 4 is a circuit diagram showing one embodiment of the rear portion of the liquid crystal display driver according to the present invention.

After this, the signal VU is divided, as shown in FIG. 4, so that the divided signals are separately inputted through current buffers B to the video signal driver He. In the case of this embodiment, said division is made at stages to generate signals having eight gradations of density.

These individual signals having the gradations are selected by a gradation voltage select signal D-U to be inputted to the video signal driver He, so that the selected signals are inputted to the individual video signal lines X of the liquid crystal panel PNL.

Like the aforementioned signal VU, the signal VL also has its voltage divided by resistors, so that the divided signals are separately inputted through the current buffers B to the video signal driver Ho.

Moreover, these individual signals having the gradations are selected by a gradation voltage select signal D-L to be inputted to the video signal driver Ho, so that the selected signals are inputted to the individual video signal lines X of the liquid crystal panel PNL.

The liquid crystal display driver thus constructed according to the embodiment generates the viewing angle correcting signal at first on the basis of the vertical synchronizing signal which is generated by the pulse at the scanning start of one field.

As a result, even if said viewing angle correcting signal is then converted into an AC signal, this AC signal can function as it is without deteriorating the viewing angle correcting function.

Thus, the display characteristics such as the flicker in the display screen or the crosstalk to be caused vertically of the screen can be improved while correcting the viewing angle characteristics by effecting said AC conversion with the polarity change for every scanning lines.

From these effects, the viewing angle characteristics can be corrected by premising that the polarities of the voltages to be applied to the liquid crystal are changed for every scanning lines.

Although the foregoing embodiments have been described with the assumption that the viewing angle correcting signal has a saw-tooth waveform, the angle correcting signal should not be limited thereto but can naturally take an arbitrary waveform.

Although the signals VU and VL have the different polarities in the foregoing embodiments, the polarity relation should not always be limited thereto. Those individual signals VU and VL may have identical polarities for the individual scanning lines. In this modification, however, the polarity of the signals VU and VL used in the previous frame scan have to change from that of the signals VU and VL to be used.

As has been apparent from the description thus far made, according to the liquid crystal display driver of the present invention, the viewing angle characteristics can be corrected while premising that the polarities of the voltages to be applied to the liquid crystal are changed for every scanning lines.

We claim:

1. A liquid crystal display having a viewing angle correcting function, comprising:

an angle correcting signal generator generating a viewing angle correcting signal on the basis of a vertical scanning signal which is generated by a pulse at the scanning start of one field;

an arithmetic processor, including arithmetic elements for generating two kinds of view angle correcting reference voltages around a predetermined central voltage by operating on a predetermined amplitude voltage and said viewing angle correcting signal, one of said arithmetic elements having an input terminal capacitance-coupled to said angle correcting signal generator, one of said two kinds of viewing angle correcting reference voltages having an inverted polarity from the other of said two kinds of viewing angle correcting reference voltages;

a chopping circuit for outputting one of said two kinds of viewing angle correcting reference voltages as a first reference voltage and the other of said two kinds of viewing angle correcting voltages as a second reference voltage according to an alternating signal; and video signal drivers generating a video signal according to a voltage select signal on the basis of said first reference voltage and said second reference voltage.

2. A liquid crystal display having a viewing angle correcting function according to claim 1, wherein said chopping circuit includes two switches to switch said two kinds of viewing angle correcting reference voltage in response to said alternating signal.

* * * * *